No. 750,304. PATENTED JAN. 26, 1904.
A. N. RITZ.
PASTE RECEPTACLE.
APPLICATION FILED MAR. 20, 1902.
NO MODEL. 2 SHEETS—SHEET 1.

Witnesses
Geo. W. Young,
B. C. Roloff.

Inventor
August N. Ritz
By H. G. Underwood
Attorneys

No. 750,304. PATENTED JAN. 26, 1904.
A. N. RITZ.
PASTE RECEPTACLE.
APPLICATION FILED MAR. 20, 1902.
NO MODEL. 2 SHEETS—SHEET 2.

Witnesses
Leo W. Young
B. C. Roloff

Inventor
August N. Ritz
By H. G. Underwood
Attorneys

No. 750,304. Patented January 26, 1904.

UNITED STATES PATENT OFFICE.

AUGUST N. RITZ, OF MILWAUKEE, WISCONSIN.

PASTE-RECEPTACLE.

SPECIFICATION forming part of Letters Patent No. 750,304, dated January 26, 1904.

Application filed March 20, 1902. Serial No. 99,067. (No model.)

*To all whom it may concern:*

Be it known that I, AUGUST N. RITZ, a citizen of the United States, and a resident of Milwaukee, in the county of Milwaukee and State of Wisconsin, have invented certain new and useful Improvements in Paste-Receptacles; and I do hereby declare that the following is a full, clear, and exact description thereof.

My invention relates to receptacles for containing paste and analogous adhesive material; and it consists in certain peculiarities of construction and combination of parts, as will be fully set forth hereinafter in connection with the accompanying drawings, and subsequently claimed.

Figure 1:
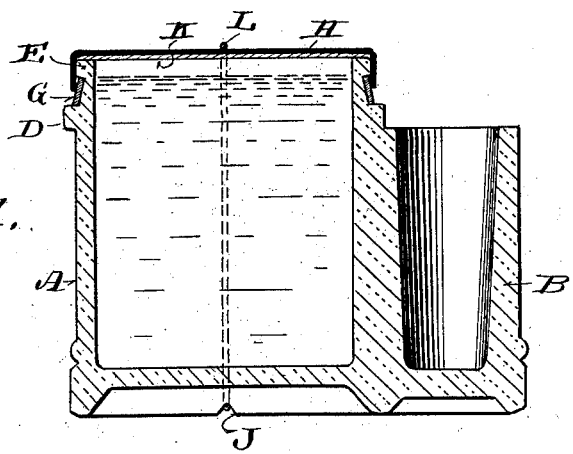
Figure 2:
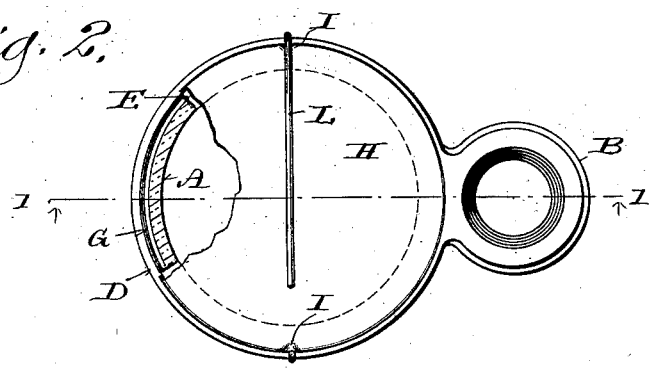
Figure 3:
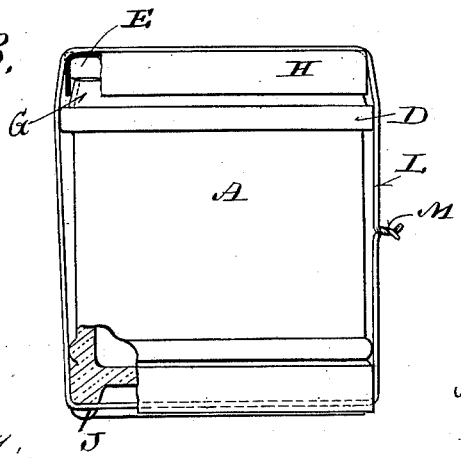
Figure 4:
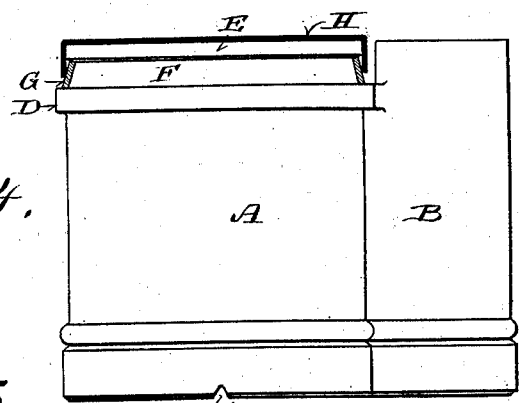
Figure 5:
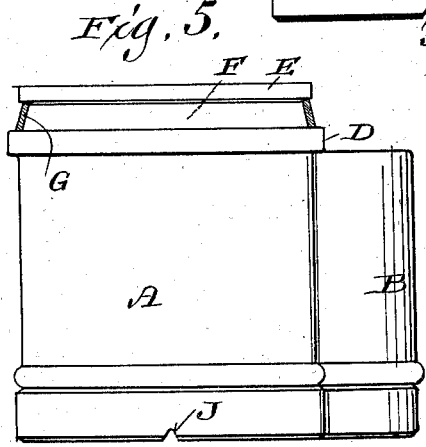
Figure 7:
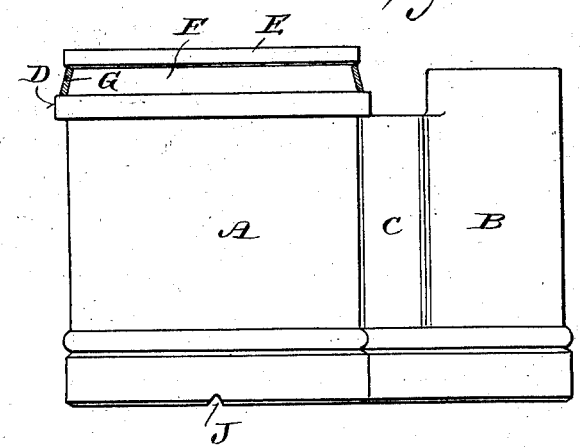
Figure 6:
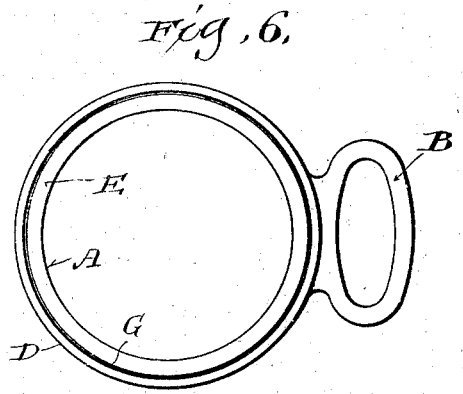
Figure 8:
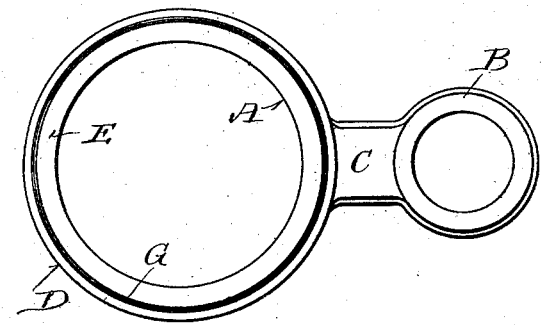

In the said drawings, Figure 1 is a vertical central sectional view of one form of my said receptacle, taken on the line 1 1 of Fig. 2. Fig. 2 is a plan view of the same, partly broken away to better illustrate certain details of construction. Fig. 3 is a view in end elevation of the same, also partly broken away for the same purpose. Fig. 4 is a view in side elevation and partly in section of another form of my said invention, the fastening-wire being omitted in this view. Figs. 5 and 7 are similar views illustrating other forms of the present invention; and Figs. 6 and 8 are plan views of the forms shown in Figs. 5 and 7, respectively, the covers as well as the fastening-wires being omitted in said views.

Referring especially to the form shown in Figs. 1, 2, and 3, A represents the receptacle for paste, mucilage, or analogous adhesive material, and B designates a brush-well, which is entirely exterior to the paste-receptacle A, (the latter being free from any interior partition,) but the parts A and B being preferably formed integrally with each other and usually of glass, the upper end of the part B shown in this form of my invention terminating on a plane below that of the top of the main receptacle A, substantially as shown in my prior patent, No. 674,990, dated May 28, 1901, the said part B being designed to hold the paste-spreading brush and to contain when in use a sufficient quantity of water to keep the operative end of the brush in a suitably moist and pliable condition.

In Fig. 4 the brush-well B is shown as rising to the same plane as the top of the main receptacle A.

In the form illustrated in Figs. 5 and 6 the brush-well is shown as terminating at a plane below the top of the part A and as being of a generally oval or oblong shape in cross-section, so as to receive a wide flat brush, instead of being circular, as in the form illustrated in Figs. 1 and 2, while in the form illustrated in Figs. 7 and 8 the brush-well B is shown as integrally united to the part A by a web C, so that the parts A and B are at some considerable distance from each other, the part B in this form rising to a plane above that of the web C, but below that of the top of the part A. In all other respects the construction of the four forms herein illustrated is identical, the receptacle A in all of said forms being made with an exterior surrounding flange D adjacent to its upper end and an exterior top flange E of less diameter, leaving a shallow exterior groove F between the said flanges for the reception of a packing-gasket G of suitable flexible yielding material, such as india-rubber.

H represents the cap or cover of the receptacle A, and the same is preferably stamped or otherwise formed of sheet metal, such as tin-plate, although any suitable material may be employed for the cover, which is preferably formed with opposed depressions, notches, or indentations I I in its upper edge, and the lower edge of the receptacle A is preferably formed with corresponding depressions, notches, or indentations J J. The covers H, especially when made of sheet metal, are preferably lined with suitable material, such as paper or thin cardboard K, to guard against rust or corrosion, this lining being either in the form of a disk or an annulus, as preferred, and when the receptacle A has been filled with desired adhesive substance and the cover H placed thereon a wire or other fastening device L is drawn around the closed part A and its ends twisted or otherwise knotted or secured together, as shown at M, and the article is in complete marketable condition.

The lower edge of the cover H bears down tightly upon the flexible packing-gasket G, thereby effectually excluding air from the receptacle A and keeping the paste or other contents clean and in a suitable moist condition for use, and by reason of the upper edge of the gasket being held within the groove F by the lower overlapping edge of the described exterior flange E there is no danger or liability of the said gasket being drawn upward out of place when the cover is removed, as might otherwise happen, particularly if a portion of the adhesive contents of the receptacle chanced to be interposed at any time between the adjacent surfaces of the cover and gasket.

While I prefer to construct circumferential flanges, as shown at D E, so as to leave an annular recess between them for the reception of the gasket G, it will be understood that broken or interrupted projections may be formed in lieu of the said flanges or that the grooves or recesses may be simply formed in the exterior of the receptacle A for the reception of the said gasket and accomplish the same purpose, and, further, it is important to form said groove or recess with an inclined wall, so that the gasket will be similarly inclined, as shown in the drawings, as thereby the cover H is more readily pushed down to the proper place for the exclusion of air, and hence extreme nicety in the relative proportions of receptacle and cover is not necessary, because the lower edge of the cover-flange will be certain to effectually seal the package when it is forced down the inclined surface of the gasket as far as it will go; but in order to produce the best results it is essential that the inclined wall of the said groove or recess should be on a straight oblique line and that the depending cover-flange should be on a straight vertical line to insure perfect contact and complete exclusion of air at any point where the lower edge of said flange touches the outer inclined surface of the gasket in said recess, and the upper and lower walls of said groove should be on substantially horizontal lines to better hold said gasket. Further, owing to the tendency of india-rubber to repel any object pressed against it there is a peculiar advantage in the described fastening means to be employed while the receptacles containing the paste are in storage or shipment.

Having thus described my invention, what I claim as new, and desire to secure by Letters Patent, is—

1. A receptacle for paste or analogous adhesive material, having an annular groove in its outer surface adjacent to its upper end, said groove having an absolutely straight inclined wall, intermediate of its upper and lower walls, in combination with a surrounding flexible gasket fitting within said groove, and having its entire upper and lower edges in contact with the upper and lower walls of said groove, and a cover having an absolutely vertical depending flange for engagement with the outer straight inclined surface of said gasket.

2. A receptacle for paste or analogous adhesive material, formed with a series of notches or depressions in its lower edge and with an oblique walled annular groove in its outer upper end, said groove being of greater diameter at its lower than at its upper edge, in combination with an elastic gasket fitting within said groove; a cover having a series of notches or depressions in its upper edge, and a depending flange in engagement with said gasket, and a wire or analogous device fastened around the closed receptacle, and fitting within said notches or depressions in the receptacle base and cover, whereby the cover is held downward on the gasket, against the continuous upward pressure of the latter.

3. In a paste-receptacle, the combination with the vessel-body having an obliquely-disposed elastic gasket held against the outer surface of its upper end, of a cover having a downward flange impinging upon the said gasket, and a fastening-wire surrounding said receptacle and cover, whereby the said cover-flange is held with downward pressure on the said gasket, and the upward pressure of the latter thereby restrained, as long as said wire is kept fastened.

In testimony that I claim the foregoing I have hereunto set my hand, at Milwaukee, in the county of Milwaukee and State of Wisconsin, in the presence of two witnesses.

AUGUST N. RITZ.

Witnesses:
H. G. UNDERWOOD,
B. C. ROLOFF.